United States Patent [19]
Tennent et al.

[11] Patent Number: 5,968,650
[45] Date of Patent: Oct. 19, 1999

[54] THREE DIMENSIONAL INTERPENETRATING NETWORKS OF MACROSCOPIC ASSEMBLAGES OF RANDOMLY ORIENTED CARBON FIBRILS AND ORGANIC POLYMERS

[75] Inventors: Howard G. Tennent, Kennett Square, Pa.; Chun Ming Niu, Lexington, Mass.; Robert Hoch, Hensonville, N.Y.; Alan B. Fischer, Cambridge, Mass.

[73] Assignee: Hyperion Catalysis International, Inc., Cambridge, Mass.

[21] Appl. No.: 08/963,406

[22] Filed: Nov. 3, 1997

[51] Int. Cl.$^6$ ...................................................... D02G 3/00
[52] U.S. Cl. ............................................ 428/367; 428/408
[58] Field of Search ..................................... 428/359, 367, 428/408, 402, 375

[56] References Cited

U.S. PATENT DOCUMENTS 5,691,054  11/1997  Tennent et al. ......................... 428/359

*Primary Examiner*—Newton Edwards
*Attorney, Agent, or Firm*—Whitman Breed Abbott & Morgan LLP

[57] ABSTRACT

The invention relates to an interpenetrating network of carbon fibrils and a polymer, which comprises a rigidized, three-dimensional macroscopic assemblage of a multiplicity of randomly oriented carbon fibrils and an innerpenetrating mass of an organic polymer. The invention also relates to methods of making and using such innerpenetrating networks.

18 Claims, No Drawings

THREE DIMENSIONAL INTERPENETRATING NETWORKS OF MACROSCOPIC ASSEMBLAGES OF RANDOMLY ORIENTED CARBON FIBRILS AND ORGANIC POLYMERS

FIELD OF THE INVENTION

The invention relates generally to interpenetrating networks of carbon fibrils and polymers. More specifically, the invention relates to an interpenetrating network of carbon fibrils and a polymer, which comprises a rigidized, three dimensional macroscopic assemblage of a multiplicity of randomly oriented carbon fibrils and an interpenetrating mass of a polymer. Even more specifically, the invention relates to methods for making such interpenetrating networks by forming porous rigidized structures and forming an organic polymer therein.

BACKGROUND OF THE INVENTION

Carbon fibrils are vermicular carbon deposits having diameters less than 500 nanometers (nm). They exist in a variety of forms, and have been prepared through the catalytic decomposition of various carbon-containing gases at metal surfaces.

Tennent, U.S. Pat. No. 4,663,230, describes carbon fibrils that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 0.1 micron and length to diameter ratios of at least 5. Desirably they are substantially free of a continuous thermal carbon overcoat, i.e., pyrolytically deposited carbon resulting from thermal cracking of the gas feed used to prepare them.

Fibrils are useful in a variety of applications. For example, they can be used as reinforcements in fiber-reinforced network structures or hybrid network structures, i.e., networks containing reinforcements such as continuous fibers in addition to fibrils.

In recent years, much interest has been expressed in the formation of molecular composites, i.e. composites in which individual molecules of rigid rod polymers are dispersed in more flexible matrix polymers to form mutually interpenetrating networks. It is generally believed that such composites will be able to withstand stresses substantially greater than conventional composites because stress will be distributed throughout the interpenetrating molecular system. Also, such composites will be less likely to suffer localized stress and will be able to withstand higher stress and/or strain before failure.

U.S. patent application Ser. No. 08/057,328 filed May 5, 1993 [PCT US94/04879, WO 94/25268], hereby incorporated by reference, discloses methods for forming three dimensional macroscopic assemblages of randomly oriented carbon fibrils. Broadly, dispersions of fibrils in a compatible liquid are prepared and the liquid is then removed to form a low-density porous plug or mat. In a preferred method, a low-density porous fibril plug is prepared by dispersing the fibrils in solvent, e.g., n-pentane, the dispersion is charged to a pressure vessel, the vessel, is heated above the critical temperature of the solvent, and the supercritical vapor is bled out of the vessel. In this manner a solid plug having the shape of the vessel interior is obtained.

U.S. patent application Ser. No. 08/857,383, filed May 15, 1997, hereby incorporated by reference, describes rigid, porous carbon structures comprised of carbon fibrils. The fibrils are bonded or glued to one another at their intersections. Bonding can be induced by chemical modification of the surface of the fibers to promote bonding, by adding "gluing" agents and/or by pyrolyzing the fibrils to cause fusion or bonding at the points of interconnection.

OBJECTS OF THE INVENTION

It is a primary object of the invention to produce a molecular composite based on a network of carbon fibrils interpenetrated with a polymer.

It is a further object of the invention to create an interpenetrating network of carbon fibrils and an organic polymer which has the advantages of molecular composites, i.e. superior stress resistance, resistance to cracking and toughness.

It is a further and related object of the invention to provide methods for producing rigidized, three-dimensional, macroscopic assemblages of randomly oriented carbon fibrils with an organic polymer.

It is still a further object of the invention to provide such interpenetrating networks of fibrils of different morphology, together with a range of different polymer substances, and to produce such networks in an efficient and cost effective manner.

It is still a further and related object of the invention to create the rigidized structure by processes which best permit a subsequent, in situ, polymerization of the monomer within the porous, rigidized fibril structure.

SUMMARY OF THE INVENTION

These and other objects of the invention are achieved by interpenetrating networks of carbon fibrils and polymer, comprising a rigidized, three-dimensional, macroscopic assemblage of a multiplicity of randomly oriented carbon fibrils and an interpenetrating mass of a polymer. Such interpenetrating networks can be obtained by forming a rigidized, three-dimensional, porous, macroscopic assemblage of a multiplicity of randomly oriented carbon fibrils, introducing a liquid or gas phase organic monomer into the porous interior of the assemblage, together with an appropriate catalyst or free-radical initiator, and causing the monomer to polymerize under polymerization conditions within the assemblage.

DETAILED DESCRIPTION OF THE INVENTION

Definitions

The term "fibril" refers to carbon fibers having a small diameter and includes fibrils, whiskers, nanotubes, buckytubes, etc.

The term "assemblage" refers to any configuration of a mass of individual fibrils and embraces intertwined as well as discrete fibril embodiments.

The term "macroscopic" means that the assemblages may be of any suitable size to achieve an industrial or scientific purpose.

Fibrils

The fibrils used in the invention have a diameter less than 1000 nm, preferably less than about 200 nm, even more preferably less than 100 nm and most preferably less than 50 nm. According to one embodiment of the invention, carbon fibrils having diameters in the range of 3.5 to 70 nm are used to form the rigid assemblage.

U.S. Pat. No. 4,663,230 to Tennent, hereby incorporated by reference, describes carbon fibrils that are free of a continuous thermal carbon overcoat and have multiple ordered graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 100 nm and length to diameter ratios of at least 5. Desirably they are substantially free of a continuous thermal carbon overcoat, i.e., pyrolytically deposited carbon resulting from thermal cracking of the gas feed used to prepare them. The Tennent invention provided access to smaller diameter fibrils, typically 3.5 to 70 nm and to an ordered, "as grown" graphitic surface. Fibrillar carbons of less perfect structure, but also without a pyrolytic carbon outer layer have also been grown.

U.S. Pat. No. 5,171,560 to Tennent et al., hereby incorporated by reference, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than 100 nm and a length to diameter ratio of greater than 5. These fibrils are of primary interest in the invention.

When the projection of the graphitic layers on the fibril axis extends for a distance of less than two fibril diameters, the carbon planes of the graphitic nanofiber, in cross section, take on a herring bone appearance. These are termed fishbone fibrils. Geus, U.S. Pat. No. 4,855,091, hereby incorporated by reference, provides a procedure for preparation of fishbone fibrils substantially free of a pyrolytic overcoat. These fibrils are also useful in the practice of the invention.

Oxidized nanofibers may be used to form the rigid porous assemblage. McCarthy et al., U.S. patent application Ser. No. 351,967 filed May 15, 1989, hereby incorporated by reference, describes processes for oxidizing the surface of carbon fibrils that include contacting the fibrils with an oxidizing agent that includes sulfuric acid ($H_2SO_4$) and potassium chlorate ($KClO_3$) under reaction conditions (e.g., time, temperature, and pressure) sufficient to oxidize the surface of the fibril. The fibrils oxidized according to the processes of McCarthy, et al. are non-uniformly oxidized, that is, the carbon atoms are substituted with a mixture of carboxyl, aldehyde, ketone, phenolic and other carbonyl groups. Fibrils have also been oxidized non-uniformly by treatment with nitric acid. International Application PCT/US94/10168 discloses the formation of oxidized fibrils containing a mixture of functional groups.

In published work, McCarthy and Bening (Polymer Preprints ACS Div. of Polymer Chem. 30 (1)420(1990)) prepared derivatives of oxidized fibrils in order to demonstrate that the surface comprised a variety of oxidized groups. Fibrils may also be oxidized using hydrogen peroxide, chlorate, nitric acid and other suitable reagents.

The fibrils may be further functionalized as set forth in U.S. patent application Ser. No. 08/352,400, filed Dec. 8, 1995, by Hoch and Moy et al., entitled "Functionalized Fibrils", hereby incorporated by reference.

Carbon fibrils of a morphology similar to the catalytically grown fibrils described above have been grown in a high temperature carbon arc (Iijima, Nature 354 56 1991, hereby incorporated by reference). It is now generally accepted (Weaver, Science 265 1994, hereby incorporated by reference) that these arc-grown fibrils have the same morphology as the earlier catalytically grown fibrils of Tennent. Arc grown carbon fibrils are also useful in the invention.

The fibrils may also be high surface area fibrils disclosed in U.S. Provisional Application Ser. No. 60/017,787 (CMS Docket No.: 370077-3630) entitled "High Surface Area Nanofibers, Methods of Making, Methods of Using and Products Containing Same", hereby incorporated by reference.

Fibril Aggregates and Assemblages

The "unbonded" precursor fibrils may be in the form of discrete fibers, aggregates of fibers or both. Aggregates, when present, are generally of the bird's nest, combed yarn or open net morphologies. The more "entangled" the aggregates are, the more processing will be required to achieve a suitable composition if a high porosity is desired. This means that the selection of combed yarn or open net aggregates is most preferable for the majority of applications. However, bird's nest aggregates will generally suffice.

The fibril mats or assemblages have been prepared by dispersing fibrils in aqueous or organic media and then filtering them to form a mat or assemblage.

Rigidized assemblages are prepared by intimately mixing fibrils with a glue, e.g. sugar, glycerin, polyethylene oxide, polyethylene glycol, polyacrylamide or polyacrylic acid, or, with carbonizable resins, such as phenolic resins, in a kneader, followed by extruding or pelletizing and pyrolyzing. Rigidized assemblages have also been prepared by forming a gel or paste of fibrils in a fluid, e.g. a solvent such as carbon dioxide, acetone, or a $C_2$–$C_7$ alkane or alkene, heating the gel or paste to a temperature above the critical temperature of the medium, removing supercritical fluid and finally removing the resultant porous mat or plug from the vessel in which the process has been carried out. See, U.S. patent application Ser. No. 08/057,328 entitled Three-Dimensional Macroscopic Assemblages of Randomly Oriented Carbon Fibrils and Composites Containing Same and U.S. patent application Ser. No. 08/857,383 entitled Rigid Porous Carbon Structures, Methods of Making, Methods of Using and Products Containing Same referred to above.

Polymerization of Monomers in Rigid Assemblages

An interpenetrating network of the rigidized, three-dimensional macroscopic assemblage of randomly oriented fibrils and a polymer can be formed by introducing a monomer into the rigidized assemblage together with a suitable polymerization catalyst and causing polymerization to take place under suitable conditions. The monomer may be in the liquid or the gas phase. Suitable monomers include vinyl compounds, i.e. compounds having a terminal double bond, e.g. styrene, substituted styrene, methyl methacrylate, alpha olefins, substituted alpha olefins, etc.

The monomer can be any compound that can be polymerized by either free radical mechanisms or by Ziegler-Natta catalysis. The catalyst location and the polymerization rate must be adjusted by those skilled in the art to avoid having most of the polymer formed on the outside edges of the fibril network. In such event, the interior of the porous assemblage will have void spaces and the composition will be nonuniform and therefore unsatisfactory. Accordingly it is preferred to evenly and thoroughly distribute the catalyst throughout the interior of the assemblage.

Fibrils have free radical traps and oxidized fibrils have even more free radical traps and accordingly it is advantageous to treat the rigidized assemblages in order to reduce the number of those free radical traps, particularly where the mechanism of the contemplated polymerization is based on free radicals. Such mechanisms are advantageous in the methods of the invention because initiators can be distributed throughout the fibril network before monomer is introduced and polymerization can be triggered uniformly by a temperature change.

Ziegler-Natta catalysts such as those derived from $TiCl_4$ and $ZrCl2(Cp)_2$ can also be adsorbed on the fibrils and thus can uniformly catalyze a polymerization reaction, e.g. of polypropylene, throughout the assemblage. Styrene can be polymerized, in situ, by both free radical initiation and Ziegler catalysis. Styrene is a suitable monomer because of its low cost and because it typically forms brittle matrices that can be toughened with carbon fibrils.

Propylene, the lowest cost monomer, can be polymerized with a Ziegler catalyst distributed in the rigidized assemblage, and can be polymerized to isotactic (crystalline) polypropylene, useful for its higher melting point, hardness, stiffness and toughness relative to other polyolefins.

NaOH and the carboxylic acid content determined by back-titration with 0.100 N HCl. Surface oxygen content was determined by XPS. Dispersibility in water was tested at 0.1 wt % by mixing in a Waring Blender at high for 2 min. Results are summarized in the Table I below.

TABLE 1

Summary of Direct Oxidation Runs

| Disp. H$_2$O | Ex. | Gms. Fibrils | cc Acid | Acid Conc. | Temp. °C. | Time | Wgt. Loss | COOH meg/g | ESCA, C | at % O |
|---|---|---|---|---|---|---|---|---|---|---|
| P | 12A | 1(BN) | 300 | 70% | RT | 24 hr | 0 | <0.1 | 98 | 2 |
| P | 12B | 1(BN) | 300 | 70 | rflx | 48 | <5% | <0.1 | not analyzed | |
| G | 12C | 20(BN) | 1.01 | 70 | rflx | 7 | 25% | 0.8 | not analyzed | |
| G | 12D | 48(BN) | 1.01 | 70 | rflx | 7 | 20% | 0.9 | not analyzed | |

P = Poor;
G = Good

EXAMPLES

EXAMPLE I

Preparation of Carboxylic Acid-Functionalized Fibrils Using Nitric Acid

A weighed sample of fibrils was slurried with nitric acid of the appropriate strength in a bound bottom multi-neck indented reactor flask equipped with an overhead stirrer and a water condenser. With constant stirring, the temperature was adjusted and the reaction carried out for the specified time. Brown fumes were liberated shortly after the temperature exceeded 70° C., regardless of acid strength. After the reaction, the slurry was poured onto cracked ice and diluted with DI water. The slurry was filtered and excess acid removed by washing in a Soxhlet extractor, replacing the reservoir with fresh DI water every several hours, until a slurried sample gave no change in pH from DI water. The fibrils were dried at 100° C. at 5" vacuum overnight. A weighed portion of fibrils was reacted with standard 0.100 N

EXAMPLE II

Preparation of a Rigidized Low-Density Porous Fibril Plug

Supercritical fluid removal from a well dispersed-fibril paste is used to prepare low density shapes. 50 cc of a 0.5% dispersion of the fibrils from Example 1 above in n-pentane is charged to a pressure vessel of slightly larger capacity which is equipped with a needle valve to enable slow release of pressure. After the vessel is heated above the critical temperature of pentane (Tc=196.6°), the needle valve is cracked open slightly to bleed the supercritical pentane over a period of about an hour.

The resultant solid plug of Fibrils, which has the shape of the vessel interior, has a density of 0.005 g/cc, corresponding to a pore volume fraction of 0.997%. The resistivity is isotropic and about 20 ohm/cm.

The preform is rigidized by heating to 650° C. in argon for 1 hr. Alternatively the preform is rigidized by heating to 300° C. in air for one hour.

EXAMPLE III

Preparation of a Rigidized Low-Density Porous Fibril Plug 0.333 g resorcinol, (Aldrich) is dissolved in 5.3 cc H$_2$O. After 0.491 g formaldehyde solution (37% in H$_2$O, Aldrich) is added, the solution is mixed thoroughly with 8.879 g fibril slurry (5.8%). After the addition of 7.4 cc 0.2M Na$_2$CO$_3$, the mixture is transferred to a glass vial. The sealed vial is placed in an oven at 80° C. for four days. The gel formed is washed with water. Finally, the water in the gel is exchanged with acetone.

After the supercritical acetone in the gel is removed, the product may be heated under Ar at 400° C. for 2 hr., 800° C. for 4 hr. and 1200° C. for 4 hr. to carbonize the resoreinol-formaldehyde polymer.

EXAMPLE IV

Preparation of a Rigidized Low-Density Porous Fibril Plug

Supercritical fluid removal from a well dispersed-fibril paste is used to prepare low density shapes. 50 cc of a 0.5% dispersion of "as made" fibrils in n-pentane containing a mixture of phenol formalydehyde/PEG/Glycerin as a glue is charged to a pressure vessel of slightly larger capacity which is equipped with a needle valve to enable slow release of pressure. After the vessel is heated above the critical temperature of pentane (Tc=196.6°), the needle valve is cracked open slightly to bleed the supercritical pentane over a period of about an hour.

The resultant solid plug of fibrils, which has the shape of the vessel interior is air dried and heated to 350° C. to remove PEG/Glycerin and pyrolyze the phenolic resin. The plug has a density of 0.005 g/cc, corresponding to a pore volume fraction of 0.997%.

EXAMPLE V

Porous preforms prepared as described in Examples II, III and IV are hydrogenated at 800–1400° C. in an aluminum tube using 99.999% (high purity) hydrogen and cooled to room temperature under argon.

The preforms are infiltrated with a mixture of styrene monomer/benzyl peroxide. The preform is then heated to 80° for 1 hr. to polymerize the styrene monomer. A solid polystyrene/fibril network is obtained.

EXAMPLE VI

Preforms prepared as in Examples II, III or IV are placed in a serum-capped pressure bottle containing a magnetic stirring bar. The bottle is evacuated and filled with dry nitrogen several times. It is then chilled to 0° C. and sparged with nitrogen which passes through a serum-capped bottle containing ca. 0.01 gm $TiCl_4$ per gm of preform at 50° C. until all the $TiCl_4$ has evaporated. The bottle containing the fibrils was then held at 50° C. until all the $TiCl_4$ has evaporated. The bottle containing the fibrils is then held at 50° C. for an hour to distribute the $TiCl_4$ on the fibrils. Triethyl aluminum in the amount of 0.03 gm per gm of preform is similarly introduced.

With the bottle at 25° C., a stream of ethylene is introduced at atmospheric pressure. A strong exotherm indicates that the ethylene is polymerizing. The black fibrils turn grey, then nearly white. Polymerization is continued until ca. 150 gm per gm of preform of polyethylene has formed. An interpenetrating network of fibrils and polyethylene is obtained.

EXAMPLE VII

A mixture of 1 m mol methyl alomoxane and 10 $\mu$mol biscyclopenta dienyl zirconium dichloride in benzene is prepared and added to a rigidized preform prepared according to Example II, III or IV to the point of incipient wetness. The system is cooled to below the freezing point of benzene and the benzene is removed by sublimation. The treated preform is taken to dry ice temperature and infiltrated with liquid propylene at 100 psi. The system is slowly warmed until polymerization initiates and maintained at that temperature for one hour. An interpenetrating network of fibrils and polypropylene is obtained.

What is claimed is:

1. An interpenetrating network of carbon fibrils and a polymer comprising:

(a) a rigidized, three dimensional macroscopic assemblage of a multiplicity of randomly oriented carbon fibrils, and (b) an interpenetrating mass of a polymer infiltrated within said assemblage.

2. An interpenetrating network of carbon fibrils and a polymer comprising:

(a) a rigidized, three-dimensional, macroscopic assemblage of a multiplicity of randomly oriented carbon fibrils, said fibrils being substantially cylindrical with a substantially constant diameter, having c-axes substantially perpendicular to their cylindrical axis, being substantially free of pyrolytically deposited carbon and having a diameter between about 3.5 and 70 nanometers, and (b) an interpenetrating mass of an organic polymer infiltrated within said assemblage.

3. An interpenetrating network of carbon fibrils and a polymer produced by a method comprising the steps of:

(a) forming a rigidized, three dimensional, porous, macroscopic assemblage of a multiplicity of randomly oriented carbon fibrils;

(b) introducing a liquid or gas phase monomer into the interior of said assemblage together with a polymerization catalyst or initiator; and (c) causing said monomer to polymerize within said assemblage thereby forming said interpenetrating network of carbon fibrils and polymer, wherein the polymer infiltrated with said assemblage.

4. An interpenetrating network of carbon fibrils and a polymer produced by a method comprising the steps of:

(a) forming a rigidized, three-dimensional, porous, macroscopic assemblage of a multiplicity of randomly oriented carbon fibrils, said fibrils being substantially cylindrical with a substantially constant diameter, having c-axes substantially perpendicular to their cylindrical axis, being substantially free of pyrolytically deposited carbon and having a diameter between about 3.5 and 70 nanometers;

(b) introducing a liquid or gas phase organic monomer into the porous interior of said assemblage together with a Ziegler catalyst or an initiator; and (c) causing said monomer to polymerize within said assemblage thereby forming said interpenetrating network of carbon fibrils and polymer, wherein the polymer infiltrated within said assemblage.

5. The interpenetrating network of claim 1, wherein said carbon fibrils have an average diameter less than 1000 nm.

6. The interpenetrating network of claim 1, wherein said carbon fibrils have an average diameter less than 200 nm.

7. The interpenetrating network of claim 1, wherein said carbon fibrils have an average diameter less than 100 nm.

8. The interpenetrating network of claim 1, wherein said carbon fibrils have diameters in the range of 3.5 to 70 nm.

9. The interpenetrating network of claim 1, wherein said carbon fibrils are free of a continuous thermal carbon overcoat.

10. The interpenetrating network of claim 1, wherein said rigidized, three dimensional, macroscopic assemblage is prepared by dispersing carbon fibrils an aqueous or organic media and then removing the media to form said assemblage.

11. The interpenetrating network of claim 1, wherein said rigidized, three dimensional, macroscopic assemblage is prepared by intimately mixing fibrils with a glue to form said rigidized assemblage.

12. The interpenetrating network of claim 1, wherein said interpenetrating mass of polymer is prepared by introducing a monomer into the rigidized assemblage together with a suitable polymerization catalyst or initiator and causing the polymerization to take place within the assemblage.

13. The interpenetrating network of claim 1, wherein said polymer comprises monomers selected from the group consisting of styrene, substituted styrene, methyl methacrylate, alpha olefins, substituted alpha olefins or mixtures thereof.

14. The interpenetrating network of claim 1, wherein said interpenetrating network is substantially free of void spaces.

15. The interpenetrating network of claim 12, wherein said monomer is a gas.

16. The interpenetrating network of claim 12, wherein said monomer is a liquid.

17. The interpenetrating network of claim 1, wherein said rigidized, three dimensional, porous, macroscopic assemblage is formed from oxidized carbon fibrils.

18. The interpenetrating network of claim 3, wherein step (c) comprises evenly and thoroughly distributing said polymerization catalyst or initiator throughout the interior of the assemblage.

* * * * *